United States Patent

Danowski

(10) Patent No.: US 8,870,459 B2
(45) Date of Patent: Oct. 28, 2014

(54) SELF-ADJUSTING BUSHING BEARING

(71) Applicant: Thomas J. Danowski, Schaumburg, IL (US)

(72) Inventor: Thomas J. Danowski, Schaumburg, IL (US)

(73) Assignee: CADventures, Inc., Schaumburg, IL (US)

( * ) Notice: Subject to any disclaimer, the term of this patent is extended or adjusted under 35 U.S.C. 154(b) by 0 days.

(21) Appl. No.: 13/927,707

(22) Filed: Jun. 26, 2013

(65) Prior Publication Data

US 2014/0003748 A1    Jan. 2, 2014

Related U.S. Application Data

(60) Provisional application No. 61/667,301, filed on Jul. 2, 2012.

(51) Int. Cl.
| | | |
|---|---|---|
| *F16C 11/06* | (2006.01) | |
| *F16C 25/04* | (2006.01) | |
| *F16C 23/04* | (2006.01) | |
| *F16C 11/08* | (2006.01) | |

(52) U.S. Cl.
CPC ............. *F16C 25/04* (2013.01); *F16C 23/046* (2013.01); *F16C 11/083* (2013.01); *F16C 11/0638* (2013.01); *F16C 11/0647* (2013.01); *F16C 11/069* (2013.01); *F16C 11/0695* (2013.01)
USPC ............ 384/209; 384/152; 384/210; 384/273

(58) Field of Classification Search
CPC .... F16C 25/04; F16C 11/0683; F16C 11/069; F16C 11/0695; F16C 11/083; F16C 23/046
USPC ......... 384/203, 206, 208–209, 210–212, 216, 384/218, 222, 245, 273, 276, 282, 295
See application file for complete search history.

(56) References Cited

U.S. PATENT DOCUMENTS

| | | | | |
|---|---|---|---|---|
| 1,331,522 A | * | 2/1920 | Parsons et al. | 277/543 |
| 1,852,501 A | * | 4/1932 | Zipay | 416/205 |
| 2,767,034 A | * | 10/1956 | McCloskey | 384/208 |
| 2,953,000 A | * | 9/1960 | Ressler et al. | 464/172 |
| 3,266,855 A | * | 8/1966 | Cleff | 384/203 |
| 3,597,025 A | * | 8/1971 | Ringel | 384/209 |
| 3,744,859 A | * | 7/1973 | Ringel | 384/206 |
| 4,057,355 A | * | 11/1977 | Allison | 384/203 |
| 4,706,971 A | * | 11/1987 | Schirmer | 277/548 |
| 4,844,650 A | * | 7/1989 | Zapushek et al. | 403/197 |
| 5,564,853 A | * | 10/1996 | Maughan | 403/137 |
| 5,714,818 A | * | 2/1998 | Eakman et al. | 310/90.5 |
| 5,913,812 A | * | 6/1999 | Smith et al. | 60/657 |
| 6,286,837 B1 | * | 9/2001 | Humphrey | 277/435 |

FOREIGN PATENT DOCUMENTS

| | | | | | |
|---|---|---|---|---|---|
| DE | 3244258 A | * | 5/1984 | | F16C 19/00 |
| EP | 0205800 B1 | * | 8/1991 | | F16C 33/60 |
| GB | 374338 A | * | 6/1932 | | F16C 11/08 |
| GB | 391960 A | * | 5/1933 | | F16C 19/60 |

* cited by examiner

*Primary Examiner* — Marcus Charles
(74) *Attorney, Agent, or Firm* — Schiff Hardin LLP

(57) ABSTRACT

In a self-adjusting bushing bearing for engagement with a bearing shaft, a bearing housing is provided. A bearing sub-assembly is received inside of said bearing housing, and said bearing sub-assembly being adapted to receive said bearing shaft. The bearing sub-assembly comprises at least two bearing segments and at least one springy element engaged with the bearing housing which compresses the bearing segments toward one another.

20 Claims, 4 Drawing Sheets

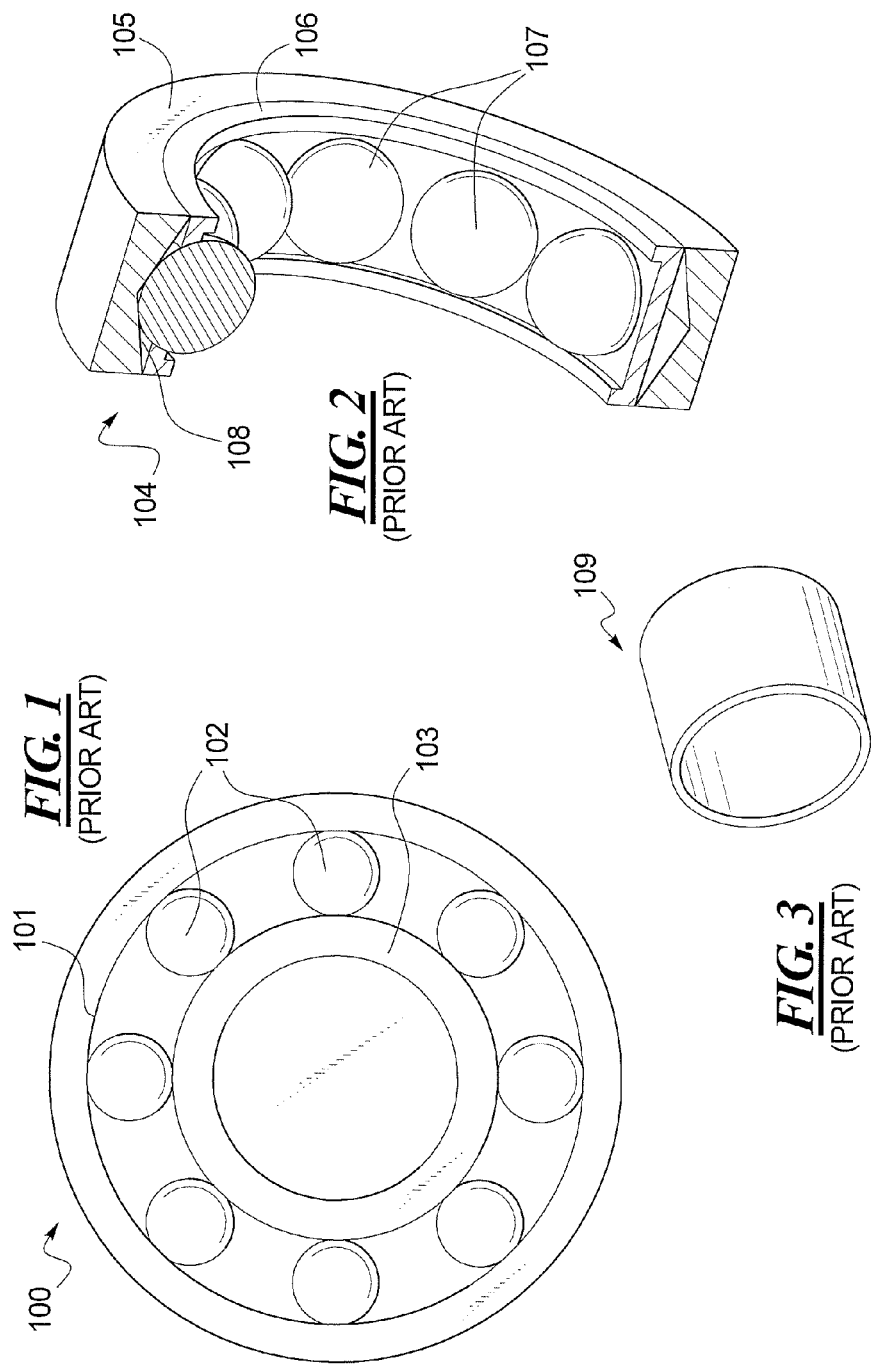

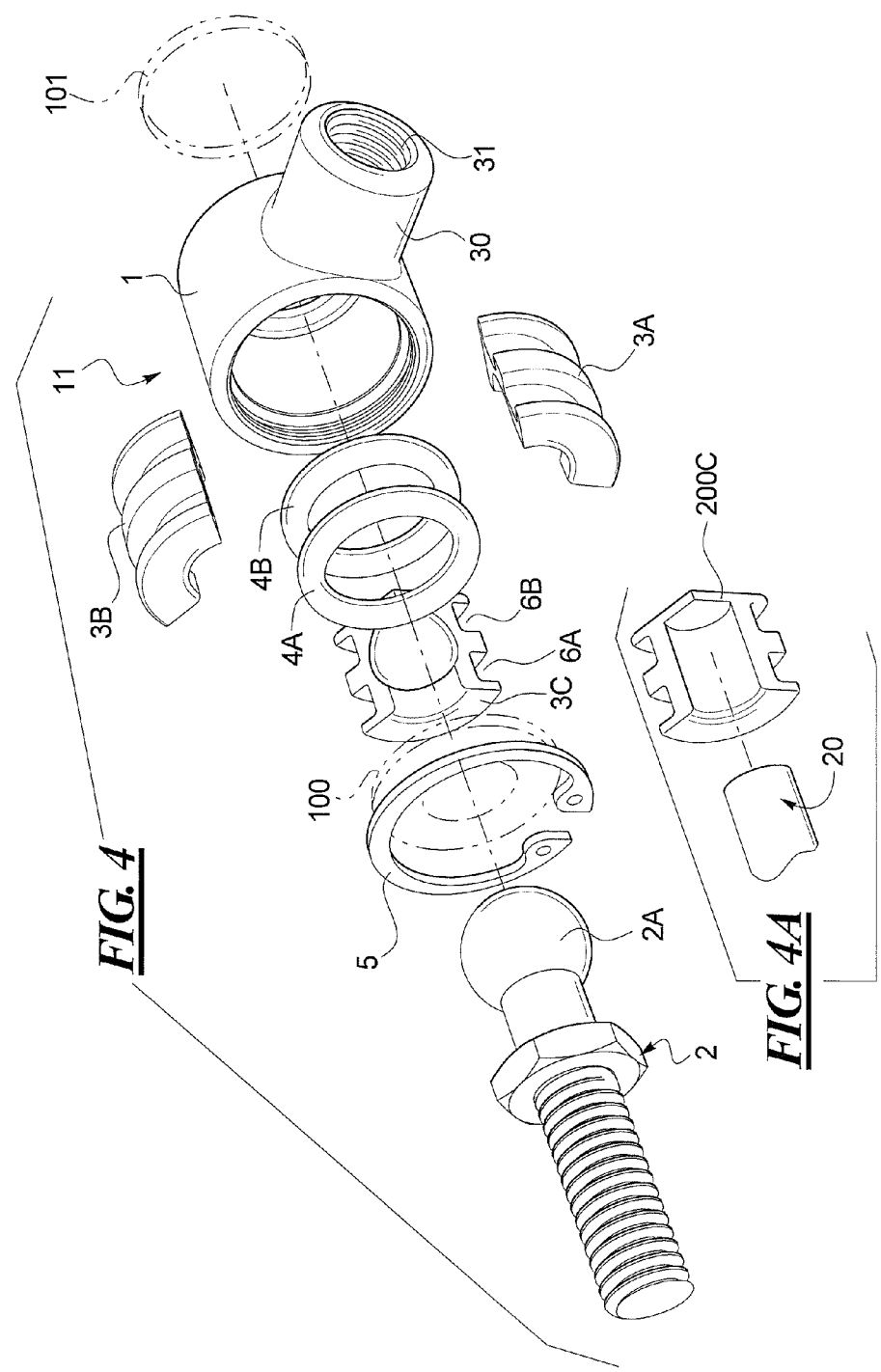

US 8,870,459 B2

SELF-ADJUSTING BUSHING BEARING

CROSS REFERENCE TO RELATED APPLICATION

The present non-provisional application claims the benefit of provisional patent application Ser. No. 61/667,301 filed Jul. 2, 2012, which is incorporated herein by reference.

BACKGROUND

A ball bearing is known in the prior art as a type of rolling-element bearing that uses balls to maintain a separation between bearing races. Such a prior art ball bearing 100 is shown in FIG. 1 in side view wherein the balls 102 are entrained between an outer bearing race 101 and an inner bearing race 103. Another example of a prior art ball bearing shown in perspective view cross-section in FIG. 2 is illustrated at 104 having an outer bearing race 105, a notch 108 in the outer bearing race, a retainer element 106, and balls 107. Instead of balls, rollers may be used entrained between bearing races.

Bushing bearings are also known such as shown at 109 in perspective in prior art FIG. 3, and are shaped as a cylinder for receiving a shaft. Such bushing bearings for example oil impregnated bushing bearings, are very inexpensive alternatives to ball and roller bearings such as shown in FIGS. 1 and 2. However, because of the relative sliding motion between the bearing bushing and a shaft passing through the bearing bushing, bushing bearings wear at a faster rate than the rolling motion in ball and roller bearings. Furthermore, as bushing bearings wear, the initial small diametral clearance between the bushing bearing and the shaft increases. The increased clearance can result in increased noise such as a "slapping" noise when the bushing bearing is used in a reciprocating mechanism. At a critical increase in diametral clearance, the circumferential lubrication boundary layer between the ID of the bushing bearing and the OD of the shaft will locally break down, resulting in bearing failure. Such a bearing failure will not only damage the bearing but will also damage the shaft. Ball, roller, and bushing bearings are also susceptible to failure if exposed to dirt or water if a seal is not used or if the seal fails.

The main drawback of the ball or roller bearing is that they are much more expensive than bushing bearings and are very susceptible to contamination, such as dirt or water. With respect to conventional bushing bearings, as they wear, not only is there increased noise due to "slapping" of the shaft against the bearing, especially in a reciprocating motion application, but there is no way of easily determining if a critical clearance has been obtained where the bearing will begin to fail, damaging both the bearing and the shaft.

SUMMARY

It is an object to allow a bushing bearing to adjust itself so that it can continually maintain a "zero clearance" with the shaft to prevent bearing slapping and lubrication failure as well as make the bearing less susceptible to contamination such as dirt and water.

In a self-adjusting bushing bearing for engagement with a bearing shaft, a bearing housing is provided. A bearing sub-assembly is received inside of said bearing housing, and said bearing sub-assembly being adapted to receive said bearing shaft. The bearing sub-assembly comprises at least two bearing segments and at least one springy element engaged with the bearing housing which compresses the bearing segments toward one another.

BRIEF DESCRIPTION OF THE DRAWINGS

FIG. 1 is a side view of a prior art ball bearing;
FIG. 2 is a perspective cross-sectional view of part of a prior art ball bearing;
FIG. 3 is a perspective view of a prior art bushing bearing;
FIG. 4 is an exploded perspective view of a self-adjusting bushing bearing of an exemplary embodiment;
FIG. 4A is a perspective view showing an alternate exemplary embodiment.

DESCRIPTION OF PREFERRED EXEMPLARY EMBODIMENTS

Figure 5:
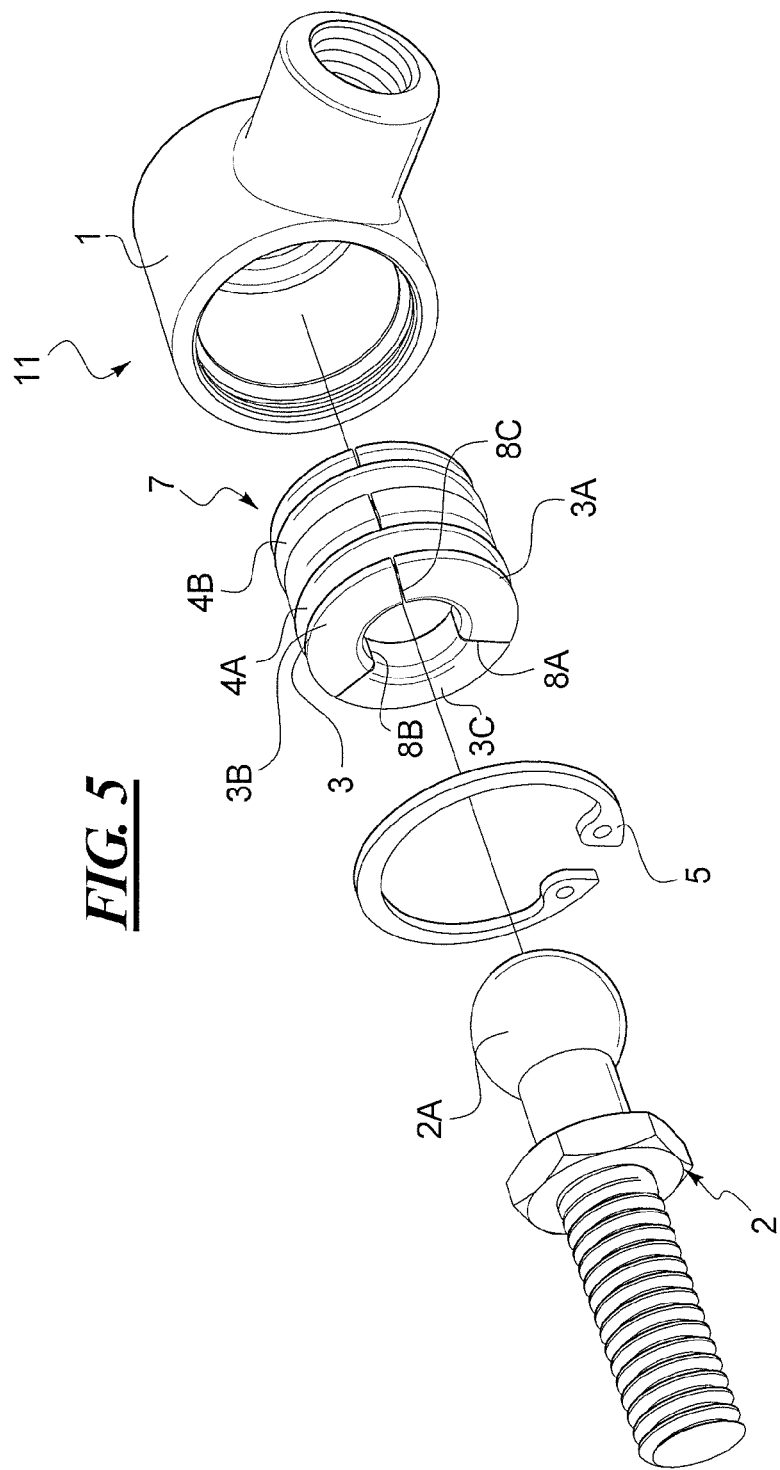
FIG. 5 is an exploded perspective view of the exemplary embodiment bearing of FIG. 4 but showing how the bearing assembly is inserted into the bearing housing and retained by a retaining ring and how bearing segments can accommodate a spherical bearing surface.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

As shown in FIGS. 4, 4A, 5, 6, and 7 self-adjusting bushing bearing 11 (SABB) of one exemplary embodiment is comprised of bushing bearing segments 3A, 3B, 3C that are held against a shaft 2 or 20 with continual "zero clearance" by means of a springy element comprising at least one and preferably two O-rings 4A, 4B wrapped around an OD of the bushing bearing segments 3A, 3B, 3C, and compressed against an ID of a bearing housing 1.

Since a clearance between the ID of the bushing bearing 3A, 3B, 3C and the OD of the shaft 2 or 20 is only as thick as a lubrication boundary layer, there is no chance of slapping or bearing failure due to excessive clearance. Also since the clearance is only the lubrication boundary layer, the SABB is much less susceptible to dirt and splashing water. Note: when used with a sintered bushing bearing material any dirt particles small enough to migrate within the lubrication boundary layer will be small enough to pass into voids in the sintered bearing material and will not get trapped between the bearing material and the shaft.

The self-adjusting feature can be used to: 1) determine how much bearing wear has taken place, 2) facilitate the ability to initially install the bearing as well as change the bearing in the field, 3) provide vibration dampening, 4) provide for some axial and angular shaft misalignment, and 5) absorb some radial shock.

The exemplary preferred embodiment differs from what currently exists. Ball and roller bearings comprised of finely machined bearings and races must be keyed in or press fit onto the shaft and/or bearing housing to keep the bearing races from rotating relative to the shaft and the housing. Likewise prior art bushing bearings must be press fit into the bearing housing to keep them from spinning relative to the housing. The material that spring loads the bearing segments onto the shaft, such as an O-ring(s) 4A and/or 4B, not only holds the exemplary embodiment SABB segments 3A, 3B, 3C against the shaft with a continual "zero clearance", but the O-ring(s) 4A, 4B are also compressed against the bearing housing 1, which keeps the bearing segments 3A, 3B, 3C from rotating relative to the bearing housing 1.

Furthermore, the change in gaps 8A, 8B, 8C between the bushing bearing segments 3A, 3B, 3C can be used to determine the amount of wear for preventative maintenance. Also the O-rings 4A, 4B eliminate the need for press fits, making it easier to initially install as well as change out in the field. The O-rings 4A, 4B also provide for vibration dampening due to any rotating shaft imbalance or to help pass through any natural frequencies during startup. The O-rings 4A, 4B also help to compensate for any shaft axial or angular misalignment, and can absorb some radial shock.

The exemplary embodiment shown in FIGS. 4, 5, 6, and 7 thus includes:

Bearing housing 1—the way of attaching the bearing to the mechanical assembly.

Bearing shaft 2 or 20—surface that the bearing contacts such as a cylindrical shaft 20 in a rotating application or a stud ball shaft 2 where the end of the shaft is in the form of a ball 2A in a reciprocating linkage application.

Bearing segments 3A, 3B, 3C—segments of the bearing (a minimum of three segments 3A, 3B, 3C is preferred) with a partial spherical pocket to receive the ball 2A. Alternatively bearing segments such as shown in FIG. 4A at 200C (only one segment being shown) without the spherical pocket are provided when a cylindrical shaft 20 (see FIG. 4A) is employed.

O-rings 4A, 4B—springy elements located between the bearing segments 3A, 3B, 3C and the bearing housing 1 that provide the continual contact between the bearing segments 3A, 3B, 3C and the bearing shaft 2 or 20.

Retaining ring 5—for retaining the bearing segments 3A, 3B, 3C in the bearing housing 1.

Circumferential grooves 6A, 6B—for locating the O-rings 4A, 4B relative to the bearing segments 3A, 3B, 3C.

Bearing sub-assembly 7—the bearing segments 3A, 3B, 3C held together by one O-ring or two O-rings 4A, 4B.

Gaps 8A, 8B, 8C—the clearance between the bearing segments 3A, 3B, 3C when assembled.

Lubrication fluid 9 (FIG. 6)—the fluid such as oil or water that provides the lubrication.

Lubrication boundary layer 10—the lubrication layer formed between the bearing segments 3A, 3B, 3C and the bearing shaft 2 or 20.

Bearing free play 12—the clearance between the OD of the bearing segments 3A, 3B, 3C and the ID of the bearing housing 1.

Bearing housing securement element 30—cylinder protruding from outer cylindrical surface of the bearing housing 1 and having an internal thread 31 for receiving an element to connect to the bearing housing.

Figure 7:
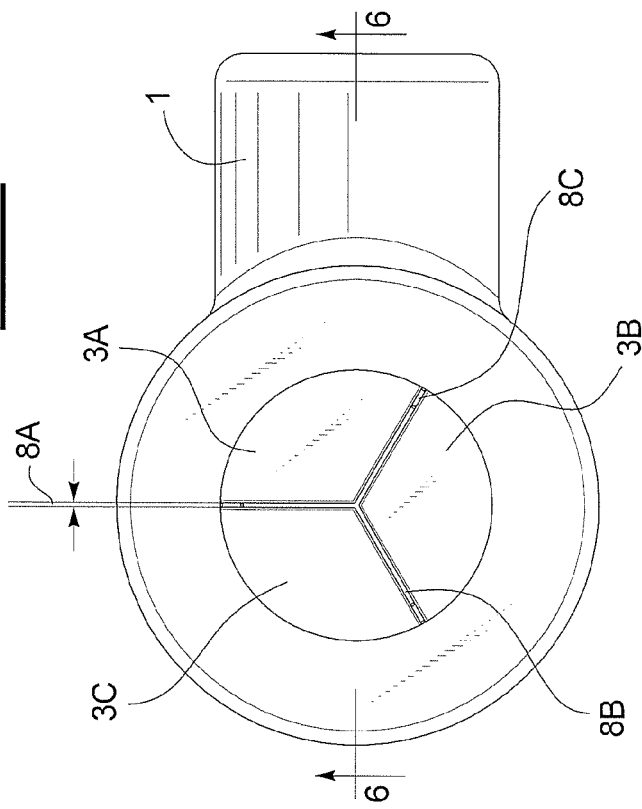
FIG. 7 is an end view of the bearing assembly of FIG. 4.
Figure 6:
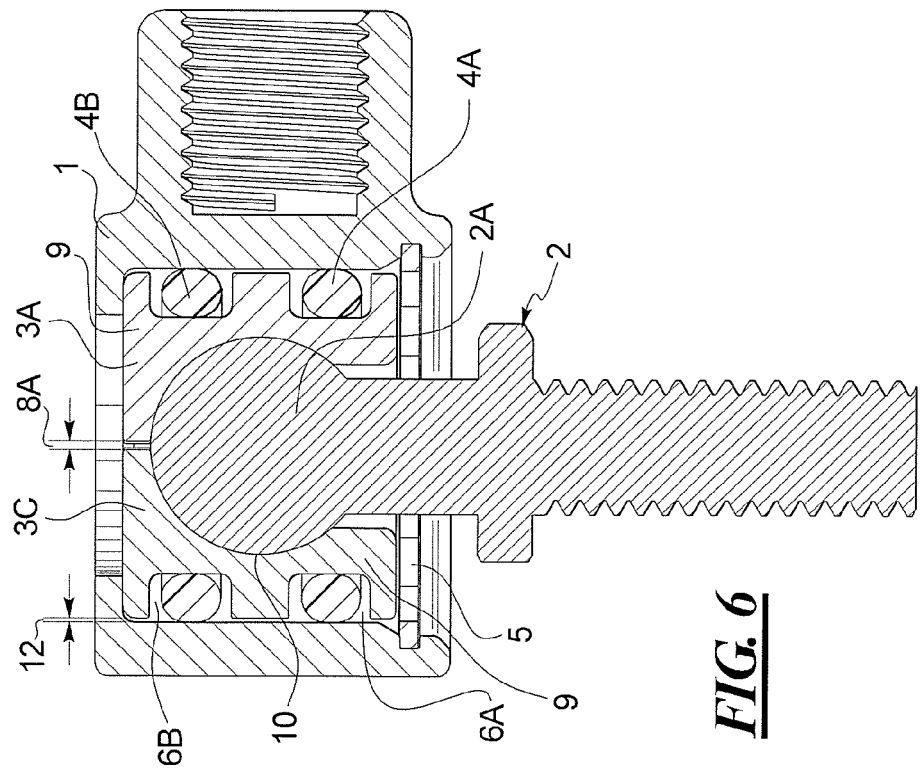
FIG. 6 is a cross-sectional view of the assembled bearing of FIG. 4 and taken along section line 6-6 in FIG. 7.

The drawing figures show the relationship between the various components in an exploded view (FIG. 4), a partially assembled view (FIG. 5), a cross-section view (FIG. 6), and an end view (FIG. 7) of an exemplary embodiment of the self-adjusting bushing bearing (SABB) assembly 11 shown in a linkage end for a reciprocating mechanism. FIGS. 4 through 6 shows that the bearing segments 3A, 3B, 3C are held against the bearing shaft 2 (or bearing shaft 20 as shown only in FIG. 4A by segment 200C) by means of a springy element comprised of at least one but preferably two O-rings 4A, 4B retained in circumferential grooves 6A, 6B on the OD of the bearing segments 3A, 3B, 3C. FIGS. 5 and 6 show how the bearing assembly 7 is inserted into the bearing housing 1 and retained by the retaining ring 5. FIG. 5 also shows that the bearing segments 3A, 3B, 3C can accommodate a spherical bearing surface. Also the O-rings 4A, 4B can be preinstalled over the bearing segments 3A, 3B, 3C and the bearing shaft 2 (or 20 as shown only in FIG. 4A) can be inserted into the bearing sub-assembly 7. FIG. 6 shows that when assembled, the O-rings 4A, 4B are compressed between the bearing housing 1 and the bearing segments 3A, 3B, 3C, pressing the bearing segments 3A, 3B, 3C against the shaft 2 (or 20 as shown only in FIG. 4A) resulting in the "zero clearance". FIGS. 6 and 7 also show the resulting gaps 8A, 8B, 8C between the bearing segments 3A, 3B, 3C when assembled and are used to indicate how much wear has taken place.

The exemplary embodiment works as follows. FIG. 6 shows that the O-rings 4A, 4B are compressed between the bearing housing 1 and the bearing segments 3A, 3B, 3C maintaining continuous contact between the bearing segments 3A, 3B, 3C and the bearing shaft 2 (or 20 as shown only in FIG. 4A) resulting in a constant "zero clearance" between the bearing segments 3A, 3B, 3C and the bearing shaft 2 or 20. The O-rings 4A, 4B have enough initial compression to insure that there is still a residual O-ring compression even when the bearing segments 3A, 3B, 3C have worn enough equal to the initial gaps 8A, 8B, 8C. When the gaps 8A, 8B, 8C approach zero, it is time to change the bearing segments 3A, 3B, 3C. When used with a sintered bearing material, the residual lubrication boundary layer is so small that any contaminant particles that are small enough to migrate into the lubrication boundary layer 10 will be small enough to pass into the voids in the sintered bearing material rather than become trapped between the bearing shaft 2 or 20 and the bearing segments 3A, 3B, 3C. The "zero clearance" also allows less viscous lubrication fluids such as water to be used as a lubrication fluid 9 such as in a bearing in a water pump or output shaft bearing for a marine propeller shaft. The residual O-rings 4A, 4B compression in conjunction with the bearing freeplay 12 is also available to help compensate for any radial or angular misalignment as well as provide damping for any vibration due to any out of balance or natural frequency, especially during startup. The residual O-rings 4A, 4B springiness also helps absorb shock loads. While the exemplary embodiment illustrated is for a linkage such as used in a reciprocating motion mechanism, the design can be used to replace any bearing application such as the bearings used in gear trains, fans, turbines, axles, etc. used with a rotating shaft in conjunction with three cylindrical ID bearing segments (for clarity only one segment 200C is shown in FIG. 4A) rather than the spherical ID bearing segments 3A, 3B, 3C shown.

Manufacture of the self-adjusting bushing bearing will now be described. The components can be made identical to current methods of manufacturing bushing bearings. For example, oil filled polymer bearings can be injection molded or extruded and machined. Oil impregnated bushing bearing segments can continue to be made by compression molding bronze particles together into the desired shape and then sintering them by heating them up to the desired sintering temperature which fuses the particles together at their points of contact. As such, features such as the O-ring retaining grooves 6A, 6B, are incorporated into the bearing mold and do not require an additional machining operation.

An odd number of bearing segments 3A, 3B, 3C with a minimum of three is recommended such that a bearing segment is always directly across from a gap 8 providing the necessary wear adjustment. In addition, at least one of the O-rings 4A or 4B, and a structure for retaining the bearing segments 3A, 3B, 3C relative to the bearing housing 1 such as a retaining ring 5 are necessary.

The O-ring retaining grooves 6A, 6B in the bearing segments 3A, 3B, 3C can be replaced by machining the grooves into the ID of the bearing housing 1 or simply by increasing the ID of the bearing housing 1 and separating the O-rings by means of a spacer ring.

One O-ring positioned halfway between the ends of the bearing segments 3A, 3B, 3C can also be used which would provide additional compensation for any angular misalignment.

A "springy element" such as an O-ring or curved wave washer could also be wrapped around and captured on the OD of each bearing segment 3A, 3B, 3C such that the bearing segments could be assembled onto a crankshaft. If individual O-rings are wrapped around and captured on the OD of each bearing segment 3A, 3B, 3C, the void space inside the O-ring could be filled with additional lubrication fluid 9 to provide a reservoir of additional lubrication fluid 9. A Zerk fitting could also be supplied on the outside of the bearing housing 1 aligned to be used to periodically resupply lubrication fluid to the reservoir provided by the O-ring wrapped on the OD of each bearing segment 3A, 3B, 3C. Also, if the bearing segments are located between seals such as 100 and 101 shown schematically with dashed lines in FIG. 4, the space between the two seals 100 and 101 can be filled with lubrication fluid to provide additional lubrication in addition to the lubrication properties of the bushing bearing material.

The self-adjusting bushing bearing of the exemplary embodiment can be used for any application currently used by a bushing, ball, or roller bearing.

Summarizing, a self-adjusting bushing bearing is disclosed in which a minimum of three bushing bearing segments are continually held against the shaft by means of O-rings, wrapped on the OD of the bushing bearing segments, and compressed against the ID of the bearing housing. The O-rings: 1) provide the force that maintains the "zero clearance" with the shaft, 2) prevent the bearing segments from spinning relative to the bearing housing, and 3) provide for vibration dampening, some axial and angular shaft misalignment, and shock absorption. The change in gap between the bushing bearing segments provides an indication of the amount of wear. The continual "zero clearance" helps prevent damage by contamination and allows the use of less viscous lubrication like water.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A self-adjusting bushing bearing for engagement with a bearing shaft where said bearing shaft comprises either a ball shaft with a ball at an end thereof or a cylindrical shaft, comprising:
    a bearing housing;
    a bearing sub-assembly received inside of said bearing housing, said bearing sub-assembly being adapted to receive said bearing shaft;
    said bearing sub-assembly comprising at least two bearing segments each having a cylindrical surface outer periphery and held together by at least one springy element comprising a compressed O-ring having a solid cross section which is substantially circular prior to compression and which when compressed has an oval-shape, said O-ring being engaged at its outer periphery with an inner surface of the bearing housing and engaged at its inner periphery with said cylindrical surface outer periphery of the bearing segments, said O-ring compressing the bearing segments toward one another, and said O-ring by said engagement at its outer periphery with the inner surface of the bearing housing preventing rotation of the bearing sub-assembly relative to said bearing housing; and
    said sub-assembly bearing segments being spaced from each other by a gap when assembled to receive said bearing shaft.

2. The bushing bearing of claim 1 wherein said O-ring is received in a groove at said outer periphery of the at least two bearing segments.

3. The bushing bearing of claim 2 wherein said O-ring has a thickness selected such that when said sub-assembly is inserted in said housing, said housing inner surface presses against said outer periphery of the O-ring.

4. The bushing bearing of claim 1 wherein a retention element is provided engageable with an open end of said housing to retain said bearing sub-assembly in said housing.

5. The bushing bearing of 4 wherein said retention element comprises a retaining ring engaged with an inner groove at said open end of said housing.

6. The bushing bearing of claim 1 wherein at least three of said bearing segments are provided.

7. The bushing bearing of claim 1 wherein said bearing segments have an inner partial cylindrical surface for receiving said cylindrical shaft when said bearing shaft is said cylindrical shaft.

8. The bushing bearing of claim 1 wherein said bearing segments each have a partial spherical surface for receiving said ball of said ball shaft when said bearing shaft is said ball shaft.

9. The bushing bearing of claim 1 wherein said gap between the segments is selected such that the gap is not closed until after a pre-determined lifetime of the bearing occurs as a result of wear at an inner surface of the curved segments.

10. The bushing bearing of claim 1 wherein a lubricant is provided at an inner surface of said sub-assembly where the bearing shaft is received.

11. The bushing bearing of claim 1 wherein said housing inner surface comprises a cylindrical inner surface, and a groove is provided at said cylindrical inner surface of said bearing housing for receiving said O-ring.

12. The bushing bearing of claim 1 wherein two of said springy elements are provided, each comprising an O-ring.

13. The bushing bearings of claim 12 wherein a spacer ring is provided between said O-rings.

14. The bushing bearing of claim 1 wherein said springy element O-ring comprises a flexible compressible material.

15. The bushing bearing of claim 1 wherein said bearing segments are located between seals and a space there between is filled with a lubrication fluid.

16. The bushing bearing of claim 1 wherein said bearing housing inner surface comprises a cylindrical inner surface, and the at least two bearing segments are curved and are held together by said at least one springy element circumferentially surrounding the at least two bearing segments.

17. The bushing bearing of claim 1 wherein each bearing segment outer periphery forms a partial cylindrical shape.

18. The bushing bearing of claim 1 wherein one or more of said springy elements are the only structure or structures to prevent rotation of the bearing sub-assembly relative to the housing.

19. A self-adjusting bushing bearing for engagement with a bearing shaft where said bearing shaft comprises either a ball shaft with a ball at an end thereof or a cylindrical shaft, comprising:

a bearing housing;

a bearing sub-assembly received inside of said bearing housing, said bearing sub-assembly being adapted to receive said bearing shaft;

said bearing sub-assembly comprising at least three bearing segments each having a cylindrical surface outer periphery and held together by at least two springy elements each comprising a compressed O-ring having a solid cross section which is substantially circular prior to compression and which when compressed has an oval-shape, each said O-ring being engaged at its outer periphery with an inner surface of the bearing housing and engaged at its inner periphery with said cylindrical surface outer periphery of the bearing segments, each said O-ring compressing the bearing segments toward one another, and each said O-ring by said engagement at its outer periphery with the inner surface of the bearing housing preventing rotation of the bearing sub-assembly relative to said bearing housing; and said sub-assembly bearing segments being spaced from each other by a gap when assembled to receive said bearing shaft.

20. A self-adjusting bushing bearing for engagement with a bearing shaft where said bearing shaft comprises either a ball shaft with a ball at an end thereof or a cylindrical shaft, comprising:

a bearing housing;

a bearing sub-assembly received inside of said bearing housing, said bearing sub-assembly being adapted to receive said bearing shaft;

said bearing sub-assembly comprising at least three bearing segments each having a cylindrical surface outer periphery and held together by at least two springy elements each comprising a compressed O-ring having a solid cross section which is substantially circular prior to compression and which when compressed has an oval-shape, said O-ring being engaged at its cylindrical surface outer periphery with an inner surface of the bearing housing and engaged at its inner periphery with said cylindrical surface outer periphery of the bearing segments, each said O-ring being received in a respective groove at said cylindrical surface outer periphery of the at least three bearing segments, each said O-ring compressing the bearing segments toward one another, and each said O-ring by said engagement at its outer periphery with the inner surface of the bearing housing preventing rotation of the bearing sub-assembly relative to said bearing housing; and said sub-assembly bearing segments being spaced from each other by a gap when assembled to receive said bearing shaft.

* * * * *